United States Patent [19]
Hu et al.

[11] Patent Number: 6,025,977
[45] Date of Patent: *Feb. 15, 2000

[54] COMBINED MAGNETORESISTIVE (MR) READ AND INDUCTIVE WRITE HEAD WITH SUNKEN WRITE COIL

[75] Inventors: Hung-Liang Hu, Los Altos Hills; Rodney Edgar Lee, Salinas; Hugo Alberto Emilio Santini, San Jose; Ching Hwa Tsang, Sunnyvale, all of Calif.

[73] Assignee: International Business Machines Corporation, Armonk, N.Y.

[*] Notice: This patent is subject to a terminal disclaimer.

[21] Appl. No.: 08/789,167

[22] Filed: Jan. 24, 1997

Related U.S. Application Data

[63] Continuation of application No. 08/367,519, Dec. 30, 1994, abandoned.

[51] Int. Cl.⁷ ............................................. G11B 5/127
[52] U.S. Cl. ............................................. 360/113
[58] Field of Search ................................. 360/113, 121, 360/126; 324/252; 338/32 R

[56] References Cited

U.S. PATENT DOCUMENTS

| | | | |
|---|---|---|---|
| 4,896,417 | 1/1990 | Sawada et al. | 29/603.14 |
| 5,212,609 | 5/1993 | Yuito et al. | 360/113 |
| 5,311,385 | 5/1994 | Schwarz et al. | 360/113 |
| 5,327,313 | 7/1994 | Nishioka et al. | 360/113 |
| 5,331,493 | 7/1994 | Schwarz | 360/113 |
| 5,452,164 | 9/1995 | Cole et al. | 360/113 |
| 5,568,335 | 10/1996 | Fontana et al. | 360/113 |

FOREIGN PATENT DOCUMENTS

| | | | |
|---|---|---|---|
| 55-004727 | 1/1980 | Japan . | |
| 57-208623 | 12/1982 | Japan | 360/113 |
| 1-113910 | 2/1989 | Japan . | |
| 4-205907 | 7/1992 | Japan | 360/113 |
| 5-290325 | 5/1993 | Japan . | |
| 5-89433 | 9/1993 | Japan . | |
| 5-298624 | 11/1993 | Japan . | |

OTHER PUBLICATIONS

T. A. Schwarz, "Perpendicular Recording Read/Write Head with High Reluctance Leg," IBM Technical Disclosure Bulletin, vol. 24, No. 4, Sep. 1981, pp. 1931–1932.

*Primary Examiner*—David D. Davis
*Attorney, Agent, or Firm*—Gray Cary Ware Freidenrich

[57] ABSTRACT

A combined sunken magnetoresistive (MR) read/write head is provided wherein first and second shield layers are eliminated or thinned down in an insulation stack region just behind a pole tip region. This provides a depression behind the pole tip region where head components, such as the write coil, insulation stack and pole pieces of a write head, are located. Leads for an MR sensor of the head extend parallel to an air bearing surface (ABS) where they connect to first and second conductors beyond the limits of the shield layers. The conductors extend back into the head normal to the air bearing surface without any danger of shorting to the shield layers.

6 Claims, 9 Drawing Sheets

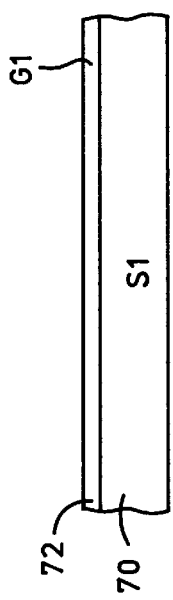
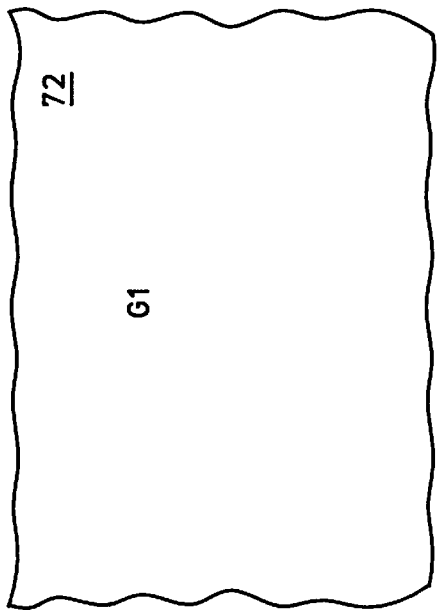
FIG. 3A
FIG. 3B
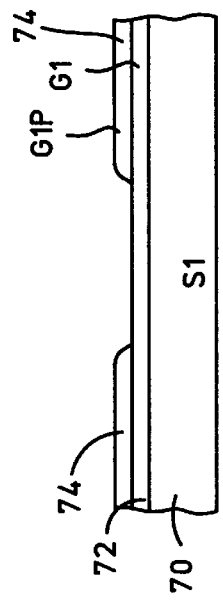
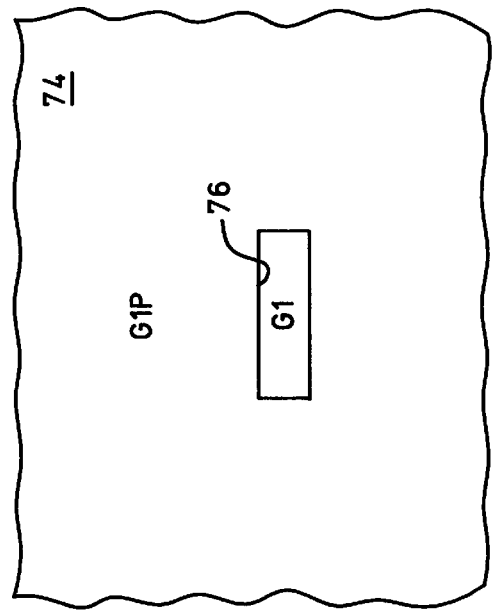
FIG. 4A
FIG. 4B

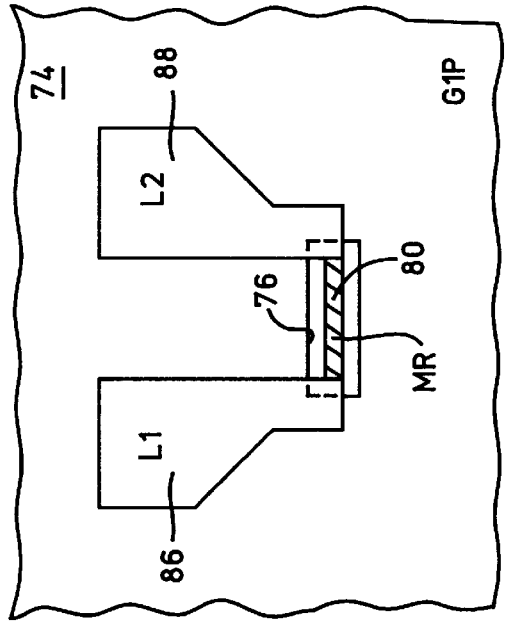
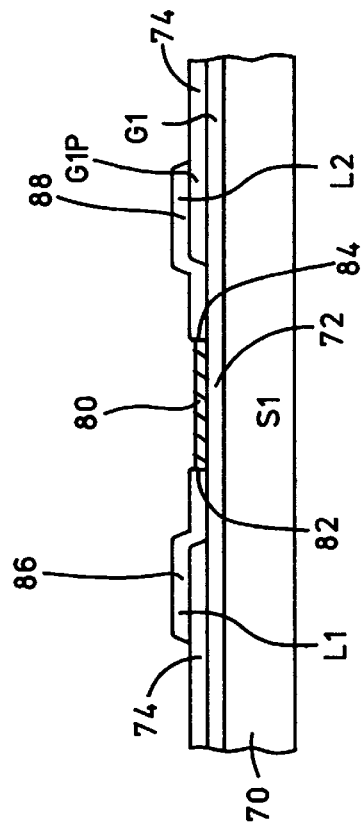
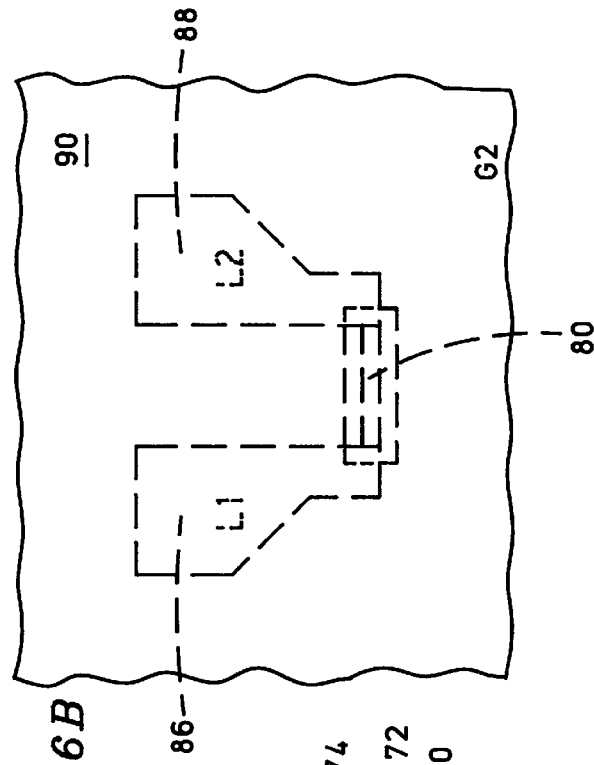
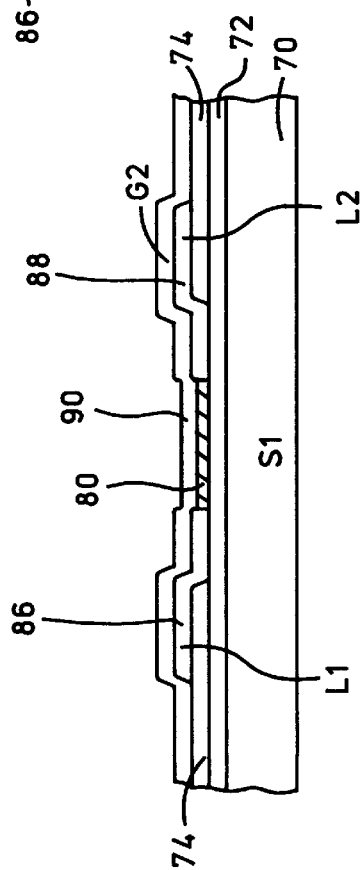
FIG. 5B
FIG. 5A
FIG. 6B
FIG. 6A

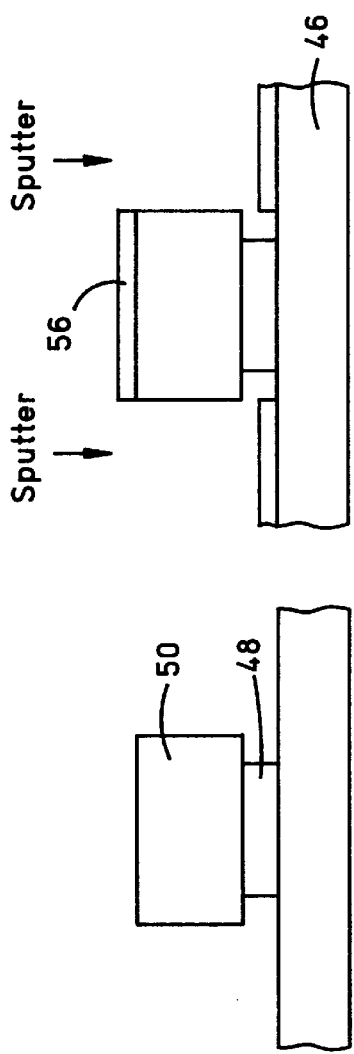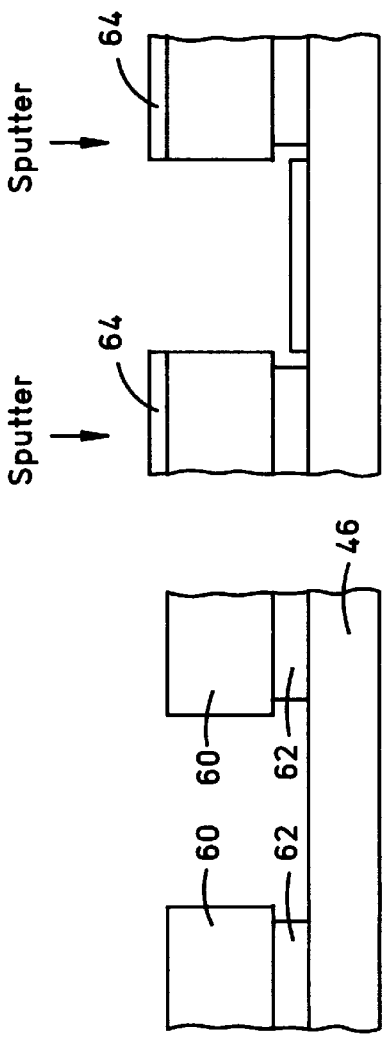

COMBINED MAGNETORESISTIVE (MR) READ AND INDUCTIVE WRITE HEAD WITH SUNKEN WRITE COIL

CROSS-REFERENCE TO RELATED APPLICATION

This application is a continuation of application Ser. No. 08/367,519 filed Dec. 30, 1994 abandoned.

BACKGROUND OF THE INVENTION

1. Field of the Invention

The present invention relates to a merged or a piggyback magnetoresistive (MR) head which has a sunken insulation stack region, wherein components such as inductive pole pieces, coil layer and insulation layers are contained.

2. Description of the Related Art

A merged or piggyback MR head includes a read head portion and a write head portion, the write head portion being located on top of the read head portion. The read head portion includes an MR sensor sandwiched between first and second gap layers which are, in turn, sandwiched between first and second shield layers. The MR sensor has an outside edge which is exposed at an air bearing surface (ABS) for reading data from a moving magnetic medium, such as a rotating magnetic disk. Changes in magnetized regions on the rotating magnetic disk induce corresponding resistance changes in the MR sensor which are detected in the form of potential changes when a sense current is conducted through the MR sensor. The write head portion includes a coil layer (write coil) sandwiched between insulation layers which are, in turn, sandwiched between first and second pole pieces. The pole pieces terminate in pole tips and are magnetically connected at a back gap, the pole tips being separated by a thin gap layer at the ABS forming a transducing gap. The separation of the pole tips is referred to as the "write gap". Flux across the write gap is recorded as information on circular tracks in the rotating magnetic disk.

In a piggyback MR head the second shield layer and the first pole piece are separate layers; in a merged MR head the second shield layer and the first pole piece are merged in a common layer which functions as a write pole during a write operation and as a second shield during a read operation. In both the piggyback and the merged MR heads the shield layers protect the MR sensor from stray magnetic fields, such as fields from adjacent data tracks and processing circuitry, these components being part of a magnetic disk drive.

Unfortunately, both shield layers in a piggyback MR head and the first shield layer in a merged MR head may adversely affect the operation of the write coil. Both the write coil and the one or more shield layers are located in an insulation stack region which is defined by the insulation layers above and below the write coil and which is located between a pole tip region and the back gap. There is a strong inductive coupling between the write coil and the one or more shield layers, which significantly adds to the reluctance of the write coil. When current is conducted through the write coil, flux induced into the one or more shield layers causes a counter flux field which opposes the flux field generated by the write coil. In order for the write coil to create a flux field of acceptable magnitude it must be enlarged to accommodate the effects of the counter flux field. This causes an additional problem. When the one or more shield layers are subjected to a high peak magnitude flux field, magnetic domains in the shield layers may be rotated substantially from an easy axis. When the magnitude of the flux field decreases these domains may not resume to their original orientations. Because of magnetostatic coupling between the shield layers and the MR sensor, the bias point of the MR sensor may change if the shield layer domain disorientation is great enough. A change in the bias point may change the response of the MR sensor to such an extent that the read back signal degrades.

Thus, there is a strongly felt need to reduce the influence of the read head shield layers on the operation of the write head and to reduce the influence of the write head via the shield layers on the operation of the read head.

The prior art structures of piggyback and merged MR heads make their fabrication difficult. In this regard, the height of the insulation stack above the write gap significantly increases the vertical profile of the second pole piece. During fabrication, the high vertical profile on the second pole piece makes it difficult to reduce the aspect ratio (thickness to width) of the second pole tip and to control the smoothness and perpendicularity ("definition") of the second pole tip's sidewalls.

The aspect ratio is determined by the ratio of the height of the photoresist masking layer, required to build the second pole tip, to the width of the second pole tip. In order to write at high data rates the width of the second pole tip must be submicron. Assuming a desired width of the second pole tip is one micron and the height of the photoresist to build the second pole tip is 10 microns, the aspect ratio is 10. As is known, it is very difficult to fabricate a well defined second pole tip with an aspect ratio of 10. Poor definition of the second pole tip sidewalls can result in poor resolution of written data. Thus, there is a strongly felt need to reduce the second pole tip's aspect ratio so that high resolution, high data rate write heads can be fabricated to match the high resolution of the read heads combined therewith.

Another item of concern in piggyback/merged MR head operation is presented by the thinness of the read head insulation layers and the potential for breakdown presented thereby.

SUMMARY OF THE INVENTION

The present invention overcomes the limitations of the prior art MR heads by eliminating one or more of the shield layers and/or thinning the one or more shield layers in the insulation stack region of the piggyback or merged MR head. In the piggyback MR head one or both of the shield layers can be eliminated or thinned down in the insulation stack region. In the merged MR head the first shield layer can be eliminated or thinned down in the insulation stack region. When the one or more shield layers is eliminated in the insulation stack region reluctance of the write coil is significantly decreased. If the one or more shield layers is thinned down in the insulation stack region instead of being eliminated, the decrease in reluctance, while not as great, is still realized. This arrangement allows for a balance of interests between the write pole and the MR sensor. By retaining a thinned down portion of one or both shield layers adequate protection of the MR sensor from stray magnetic fields can be maintained.

The elimination and/or thinning of the one or more shield layers occurs immediately behind the MR sensor in the direction of the back gap. This lowers the surface on which the insulation stack region rests, resulting in a "sunken" profile.

It should be noted that the critical region of magnetic shielding for the MR sensor is generally the pole tip region.

In this region all embodiments of the invention retain full thicknesses of the first and second shield layers. This provides an opportunity to uniquely direct the paths of first and second leads which conduct the MR sense current. The leads extend parallel to the ABS to locations which are transverse to the MR sensor and which are beyond the shield layers for further routing to the back of the head where they can be connected to pads. In prior art MR read heads, these leads are typically routed directly back into the head from their connections to the MR sensor. First and second gap layers insulate the leads from the shield layers. Since these layers are kept as thin as possible to increase resolution of the read head there is a strong potential for electrical shorting between the leads and the shields due to pin holes in the gap layers. With the present invention the potential for shorting occurs only during the short transverse extensions of the leads parallel to the ABS and not during the longer extensions to the back of the head.

By eliminating or minimizing the thickness of one or more shield layers in the insulation stack region of the present invention a recessed area is provided during the construction of the write head portion of the piggyback or merged MR head. This significantly reduces the aspect ratio so that well defined high data rate second pole tips can be fabricated for the write head portion. In the present invention the aspect ratio can be decreased from 10 or more down to about 4.

An object is to provide a more efficient combined write and read head.

Another object is to provide a piggyback or merged MR head with reduced write coil reluctance.

A further object is to reduce write coil reluctance, reduce the size of the write coil and reduce domain movement in one or more shield layers during a write operation of an MR head.

Still another object is to accomplish any of the above objects as well as reduce the aspect ratio of the head.

Still a further object is to accomplish any of the above objects as well as provide paths for conductor leads to the MR sensor which minimize electrical shorting between the conductor leads and the shield layers.

Other objects and advantages of the invention will become more apparent to one skilled in the art upon reading the following description with reference to the accompanying drawings.

DESCRIPTION OF THE DRAWINGS

FIG. 5 is a vertical cross-sectional view of a first embodiment of the invention.

FIG. 6 is a vertical cross-sectional view of layers employed in a processing step for obtaining a slanted back edge of a first shield layer of the first embodiment shown in FIG. 5.

FIG. 12 is a vertical cross-sectional view of a sixth embodiment of the invention.

FIG. 13 is a vertical cross-sectional view of a seventh embodiment of the invention.

DESCRIPTION OF THE PREFERRED EMBODIMENTS

Figure 1:
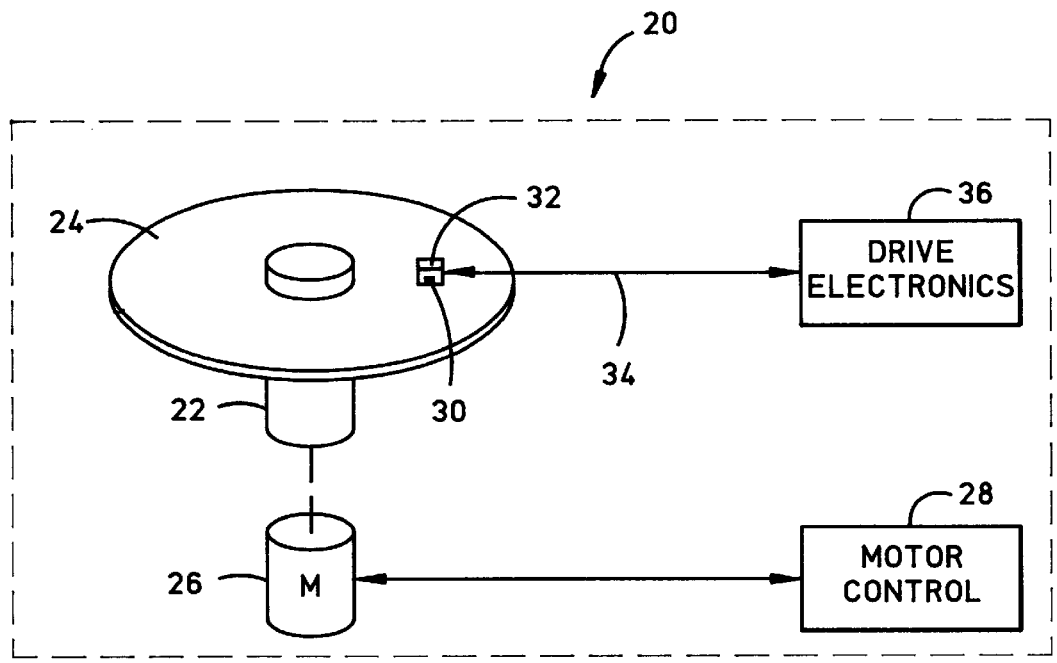
FIG. 1 is a schematic illustration of a disk drive which employs the magnetic head of the present invention.

Referring now to the drawings wherein like reference numerals designate like or similar parts throughout the several views, there is illustrated in FIG. 1 a magnetic disk drive 20. The drive 20 includes a spindle 22 which supports and rotates a magnetic disk 24. The spindle 22 is rotated by a motor 26 which is controlled by motor control 28. A magnetic head 30, which may be a piggyback or merged MR head for recording and reading on the disk 24, is mounted on a slider 32 which, in turn, is supported by a suspension and actuator assembly 34. The suspension and actuator assembly 34 positions the slider 32 so that the magnetic head 30 is in a transducing relationship with a surface of the magnetic disk 24. When the disk 24 is rotated by the motor 26, air is moved by the surface of the disk, causing the slider to ride on a cushion of air (an air bearing) slightly off the surface of the disk. The magnetic head 30 is then employed for writing information to multiple circular tracks on the surface of the disk 24 as well as reading data and servo information therefrom. Drive electronics 36 provides drive signals for writing information and processes readback and servo signals read from the disk 24.

Figure 2:
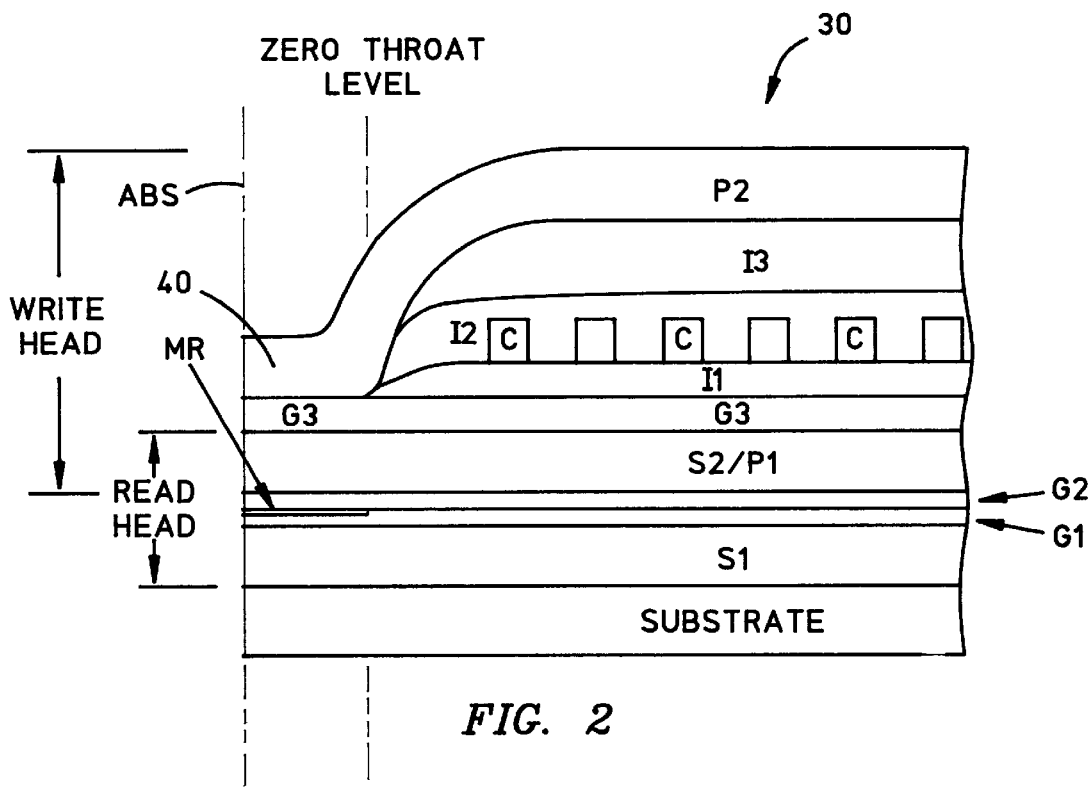
FIG. 2 is a vertical cross-sectional view of a prior art merged MR head.

In FIG. 2 there is shown a prior art merged MR head 30A which may be employed as the magnetic head 30 on the slider 32 of FIG. 1. The head 30A includes an MR sensor (MR) which is sandwiched between first and second gap layers G1 and G2 which, in turn, are sandwiched between first and second shield layers S1 and S2. Lead layers, one of which is shown at L1 in FIG. 2, are connected to the MR sensor and are also sandwiched between the first and second gap layers G1 and G2. The lead layers L1 and L2 are connected to terminal pads (not shown) which are located to the right of the broken portion shown in FIG. 2. The pads provide external electrical contact points for drive electronics 36 (see FIG. 1). The read portion of the head comprises the aforementioned components. When the magnetic disk 24 of FIG. 1 is rotated adjacent the MR sensor, magnetic regions on the disk are detected by the MR sensor causing a change in its resistance. A sense current is conducted through the MR sensor via the leads which results in changes in potential across the MR sensor which correspond to the changes in resistance of the MR sensor. These potential changes are then processed as readback signals by the drive electronics 36 shown in FIG. 1.

The prior art merged MR head 30A also includes a write portion. The write portion includes a write coil layer C (write coil) and an insulation layer I2 which are sandwiched between insulation layers I1 and I3. This region is commonly called the insulation stack region. The insulation layers I1 and I3, in turn, are sandwiched between first and second pole pieces P1 and P2. The pole pieces P1 and P2 form pole tips PT1 and PT2 to the left of the insulation stack region where the pole tips are separated by a thin gap layer G in the order of 0.2 μm thick. The pole pieces P1 and P2 are magnetically connected to the right of the insulation stack at a back gap BG. Accordingly, when signal current flows through the write coil, flux is induced into the first and second pole pieces P1 and P2 causing fringe flux to bridge across the gap G at the air bearing surface (ABS). This fringe flux writes information to the rotating magnetic disk 24 in response to the write signals provided by the drive electronics 36 shown in FIG. 1. The head 30A is called a merged MR head because one layer serves as both a second shield S2 and a first pole piece P1. This layer serves as a first pole piece P1 during the write operation and then serves as a second shield S2 during the read operation.

A significant problem with the prior art merged MR head is the large size of the shield layers S1 and S2 in the proximity of the write coil. The first and second shield layers S1 and S2 are constructed of a ferromagnetic material, such as Sendust, Permalloy or iron nitride. When the write coil is energized, the first shield layer S1 acts as an inductance which generates a counter electromotive force (CEMF) opposing the EMF of the write coil. The higher the frequency or data rate of the coil the higher the inductance of the shield layer S1.

Another problem with the prior art merged MR head 30A is the lack of definition of the second pole tip P2 at the ABS due to the high vertical profile of the second pole piece P2. This is due to the height of the insulation stack (insulation layers I1, I2 and I3). The result is a high topography second pole piece P2 which results in an undesirable high aspect ratio. For high density heads the width of the pole tip PT2 at the ABS must be very narrow, preferably 1 μm or less. The ratio of the thickness of the photoresist 40, which is necessary to construct the second pole piece P2, to the width of the pole tip P2 at the ABS sets the aspect ratio. If the thickness of the photoresist is 10 μm and the width of the second pole tip PT2 is 1 μm the aspect ratio is 10. The thickness of a prior art photoresist layer required to construct the second pole piece P2 and pole tip at the ABS is typically 10 μm or greater. When the photoresist is spun on it will assume a configuration shown at the phantom line 40 in FIG. 2. When the photoresist layer is masked and subjected to light, the light produces poor definition of the pole tip PT2 at the ABS because of the thickness of the photoresist. This results in a poorly defined pole tip PT2 which has irregular side walls which should be substantially vertical and precisely dimensioned to have good definition.

Figure 3A:
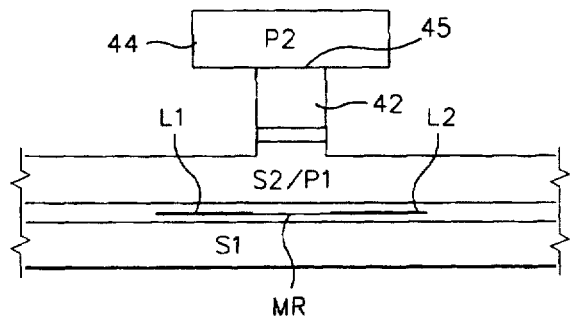
FIGS. 3A and 3B are ABS and vertical cross-sectional views respectively of a merged MR head showing a prior scheme for obtaining a well defined second pole tip.
Figure 3B:
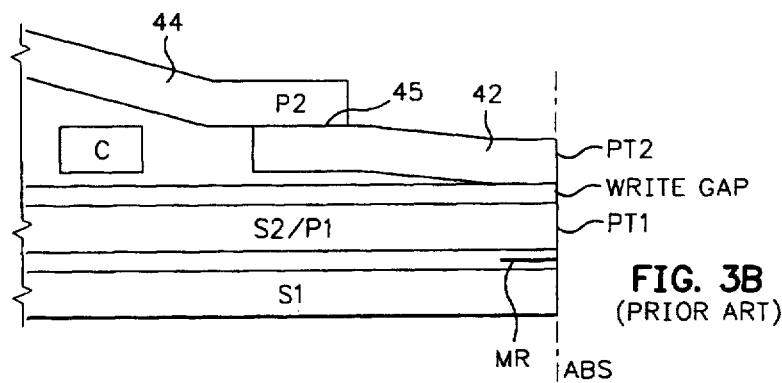

Various prior art techniques have been employed to achieve a well-defined second pole tip PT2 with a low aspect ratio. Two such techniques are shown in FIGS. 3A, 3B, 4A and 4B. In FIGS. 3A and 3B, a first portion 42 of the second pole piece P2 is formed at the ABS with a low planar profile. This provides a thin, substantially planar photoresist layer, on the order of 4 μm. Following photoresist deposition, ion beam milling or reactive ion etching is employed to define the sidewall of the pole tip. After formation of an insulation stack and write coil a second larger portion 44 of the second pole piece is stitched to the portion 42 as shown at 45 in FIG. 3B.

Figure 4A:
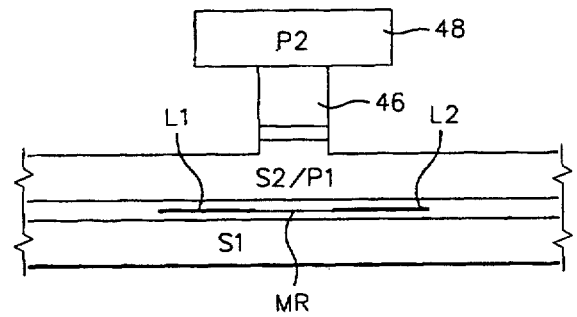
FIGS. 4A and 4B are ABS and vertical cross-sectional views respectively of a merged MR head showing another prior scheme for obtaining a well defined second pole tip.
Figure 4B:
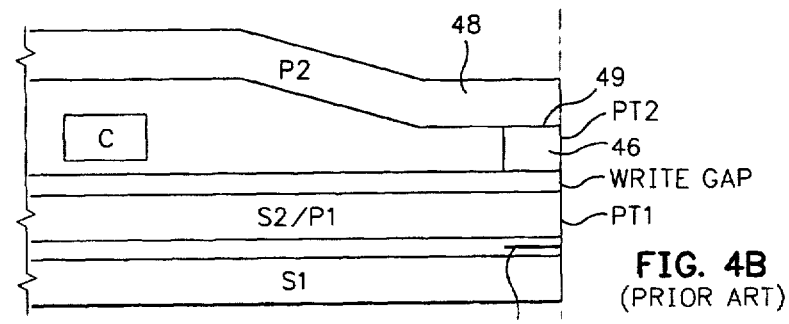
Figure 10:
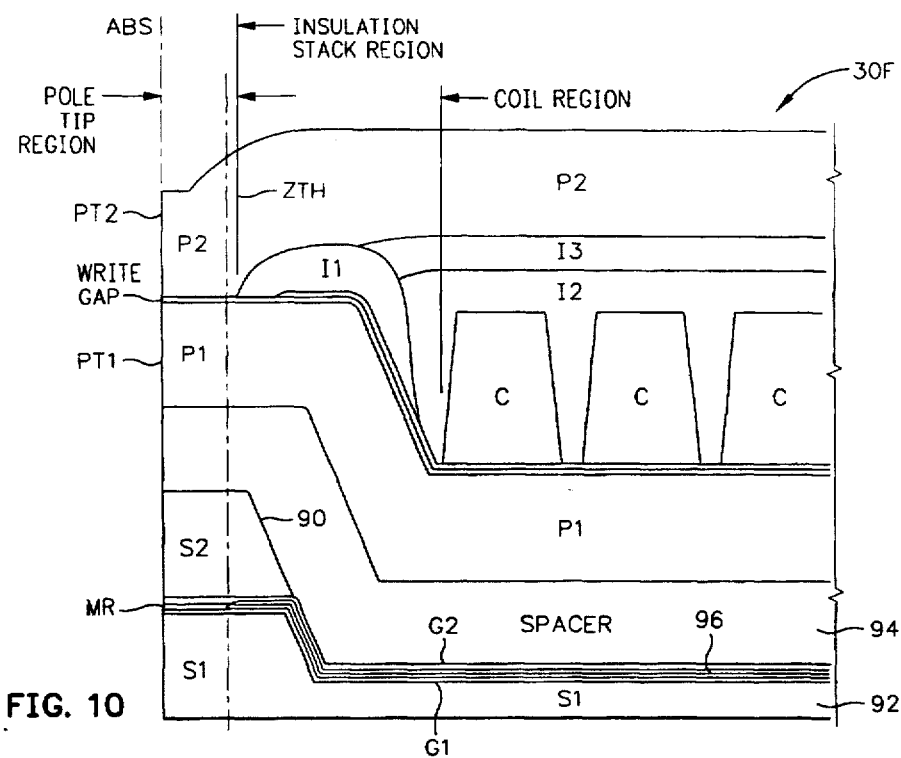

In FIGS. 4A and 4B, the pole tip PT2 is formed by portions 46 and 48. The portion 46 is constructed by patterning with a thin layer of photoresist, followed by ion beam milling or reactive ion etching to define the sidewalls. A larger piece 48 is then stitched on top of the piece 46 at 49 adjacent to the ABS so as to minimize saturation problems. Both of the construction methods shown in FIGS. 3A, 3B, 4A and 4B involve many additional processing steps which are costly and difficult to perform consistently on a production basis.

FIG. 5 illustrates a merged MR head, forming a first embodiment 30B of the present invention, which may be employed as a magnetic head 30 on the slider shown in FIG. 1. The head 30B has a pole tip region, an insulation stack region and a coil region, the pole tip region extending from the ABS to the insulation stack region, the insulation stack region extending from the pole tip region to the back gap (see FIG. 2) and the coil region located in the insulation stack region but spaced from the pole tip region. In the 30B embodiment, the first and second shield layers S1 and S2 are located in the pole tip region for the protection of the MR sensor. A significant difference between the 30B embodiment of the present invention, and the 30A embodiment of the prior art, shown in FIG. 2, is that in the 30B embodiment the first shield S1 terminates between the pole tip region and the coil region along a slope 50. This provides a sunken or depressed area 51 for subsequent thin film layers of the head which makeup the insulation stack. The second gap layer G2 extends along the slope 50 of the first shield S1, thence perpendicular to the ABS toward a back region of the head. It should be noted that leads are not shown following the same path, as shown in the prior art head in FIG. 2. The leads for the head 30B may take a different path which will be described in more detail hereinafter.

The layer S2/P1, write gap, insulation layer I1, write coil, insulation layers I2 and I3, and the second pole piece P2 are all recessed by the depression provided by the first shield layer S1 in the insulation stack region lowering the height of the second pole piece above the write gap plane so as to enhance planarization of the second pole tip PT2. This significantly reduces the aspect ratio of the resist during fabrication of the pole tip PT2, enabling construction of the pole tip at the ABS with a thin layer of resist, in the order of 4 μm as seen by the thickness of the resist layer 40 at the ABS in FIG. 5. A thinner resist layer permits a narrower pole tip to be precisely constructed with good definition, thereby enhancing the bit density of the head. Of further significance, is elimination of a large portion of the first shield layer S1, which reduces the induction that opposes the operation of the write coil. The portion of the first shield layer S1 remaining is remote from the write coil so that when high frequency currents are conducted through the write coil, its EMF is not significantly opposed by the CENF of the first shield S1. Accordingly, the embodiment 30B provides a significant improvement over the prior art merged MR head. The slope 50 of the first shield S1 may be constructed by a resist layer with a negative slope 52, as shown in FIG. 6. Permalloy may then be plated adjacent the negative slope, after which the resist is removed to produce the slope 50 of the first shield S1, as shown in FIG. 5.

Figure 7B:
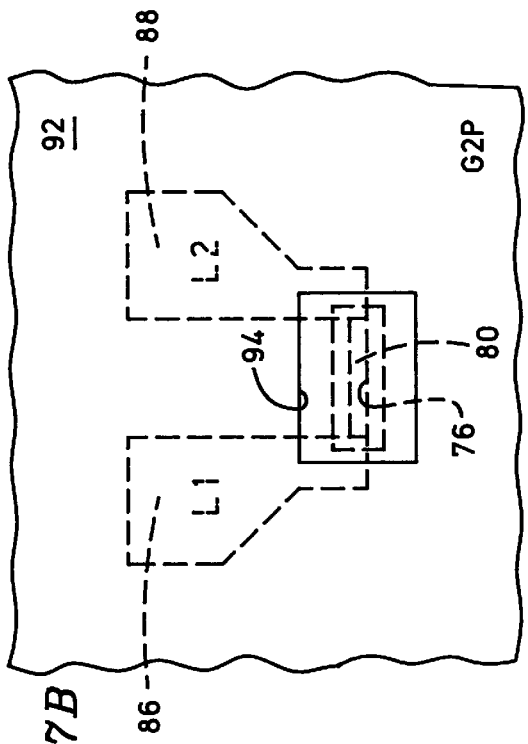
FIG. 7 is a vertical cross-sectional view of a prior art piggyback MR head.
Figure 7A:
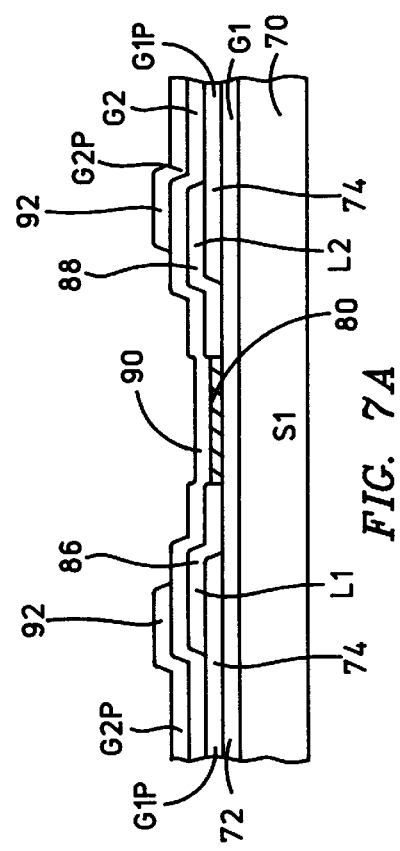

FIG. 7 is an illustration of a prior art piggyback head 30C which is the same as the merged MR head shown in FIG. 2, except the second shield layer S2 and the first pole piece P1 are separate layers which are separated by a spacer 60. The advantage of the piggyback head over the merged MR head is that the first and second shield layers S1 and S2 may be less affected by domain wall reorientation after high EMF write operations, thereby promoting a constant bias point for the MR sensor. The embodiment 30C, however, has the same disadvantages as the prior art embodiment, shown in FIG. 2, namely: (1) large shield layers S1 and S2 in the proximity of the write coil causing a high inductance during high data rates, and (2) a high vertical profile of the second pole piece P2.

Figure 8B:
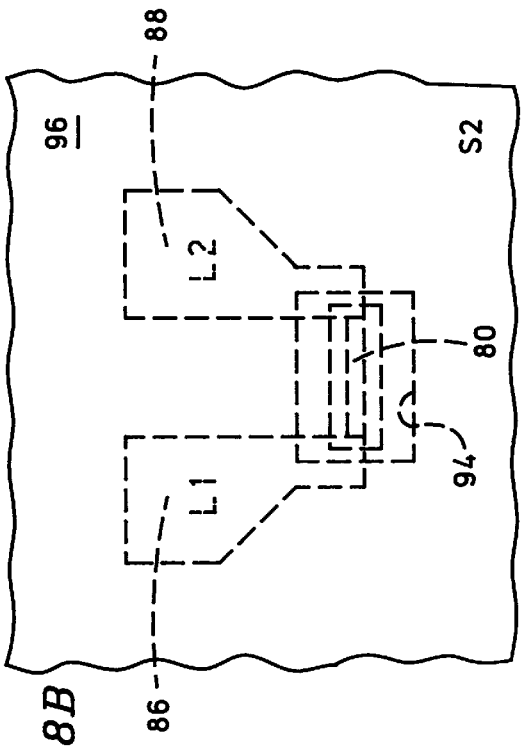
FIG. 8 is a vertical cross-sectional view of a second embodiment of the invention.
Figure 8A:
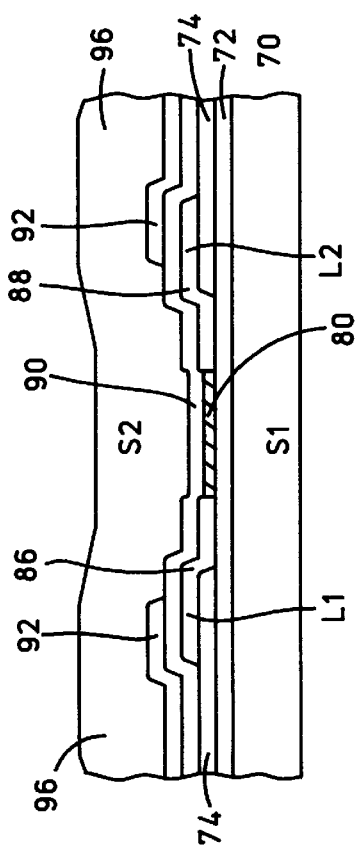

In FIG. 8 another embodiment 30D of the present invention is shown, which is an improved piggyback head. In this embodiment both of the first and second shield layers S1 and S2 terminate at 70 and 72 respectively between the pole tip region and the coil region with gap layers G1 and G2 sloping down the back portion 70 of the first shield layer and extending toward a back portion of the head. A large spacer layer 74 may be provided between the gap layers G1 and G2 and the first pole piece P1. The topography of the first pole piece P1, the first insulation layer I1, the second insulation layer I2 and the write coil, the third insulation layer I3 and the second pole piece P2 is reduced by the depression caused by the termination of the first and second shield layers S1 and S2; the insulation stack is thereby "sunken". The 30D embodiment has an advantage over the 30B embodiment, shown in FIG. 5, in that the embodiment 30D does not employ a common layer for the second shield layer S2 and the first pole piece P1. Accordingly, high magnitude EM fields occurring during write operations of the pole pieces P1 and P2 have less effect on the domain structures of the shield layers S1 and S2 and their relationship to the MR sensor. It should be noted that the lead layers for the 30D embodiment do not extend with the gap layers G1 and G2. The lead layers for this embodiment will be described in more detail hereinafter.

Figure 9:
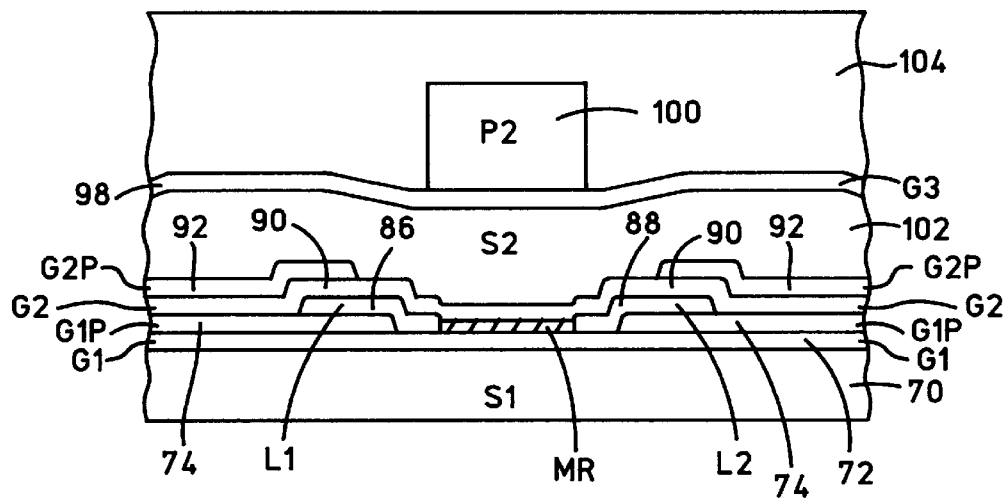
FIG. 9 is a vertical cross-sectional view of a third embodiment of the invention.

FIG. 9 shows an embodiment 30E of the present invention which is similar to the embodiment 30D, except reduced thickness portions 80 and 82 of the first and second shield layers S1 and S2 extend through the sunken insulation stack region as shown in FIG. 9 in a depression which is caused by their own reduced thicknesses. The thickness portions 80 and 82 can be about one-fourth the thickness of the first and second shield layers S1 and S2 in the pole tip region. The thicknesses 80 and 82 in the depression provide additional protection for the MR sensor from the EM fields of the write coil and other external sources such the actuator motor and other electronics. The disadvantage is that these layers 80 and 82 are inductively coupled to the write coil. However, they are remote with respect to the write coil due to the separation caused by the P1 layer and the spacer layer 84. Accordingly, the piggyback head allows thinner S1 and S2 layers 80 and 82 without significant impact on the write operation of the write coil.

Figure 10:
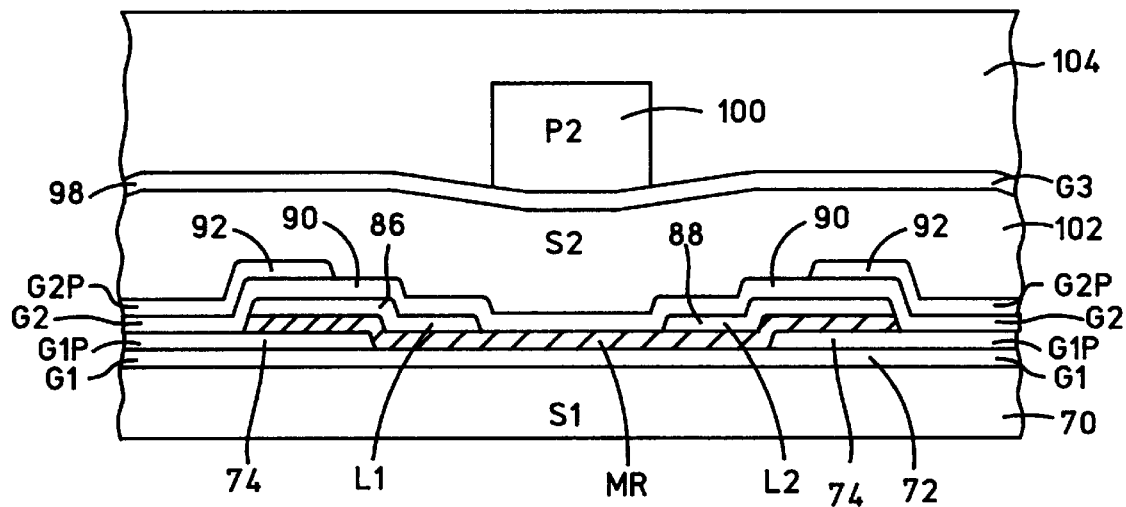
FIG. 10 is a vertical cross-sectional view of a fourth embodiment of the invention.
Figure 11A:
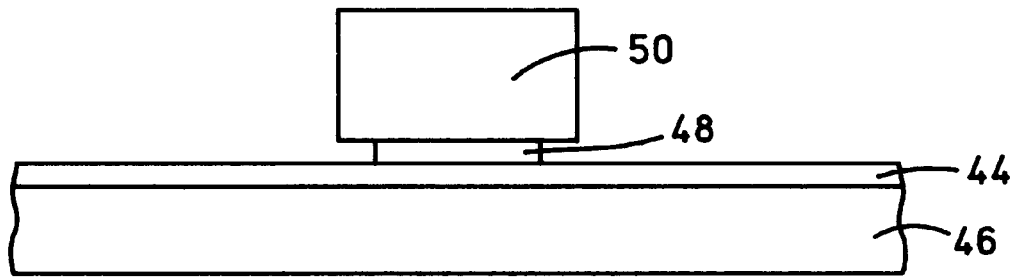
FIG. 11 is a vertical cross-sectional view of a fifth embodiment of the invention.
Figure 11B:
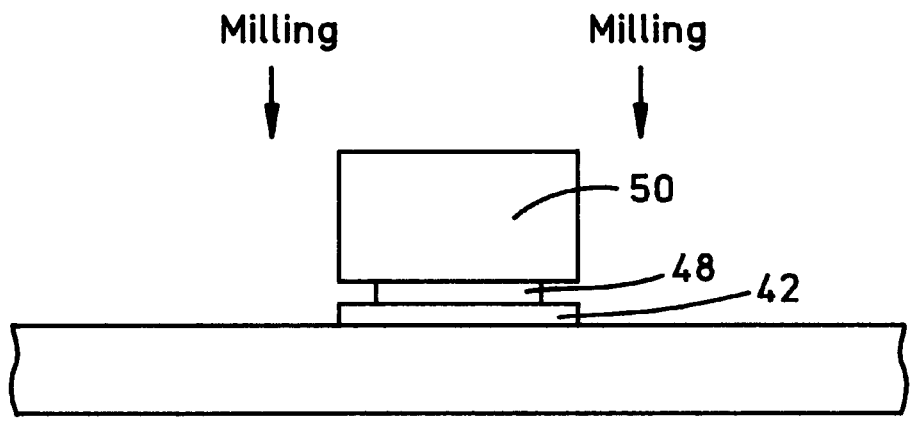
Figure 11C:
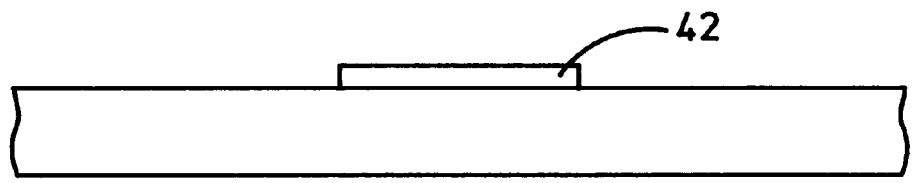

FIG. 10 is an embodiment 30F of the present invention which is similar to the 30E embodiment except the second shield layer S2 is terminated at 90 and the first shield layer S1 has a reduced thickness portion 92 extending perpendicular to the ABS in the sunken insulation stack region. Between the reduced thickness portion 92 and a spacer layer 94 are lead layers, one of which is shown at 96, which are sandwiched between first and second gap layers G1 and G2 and which extend perpendicular to the ABS in the insulation stack region. The embodiment 30F has an advantage over the 30E embodiment in that less ferromagnetic material is inductively coupled to the write coil.

Figure 11:
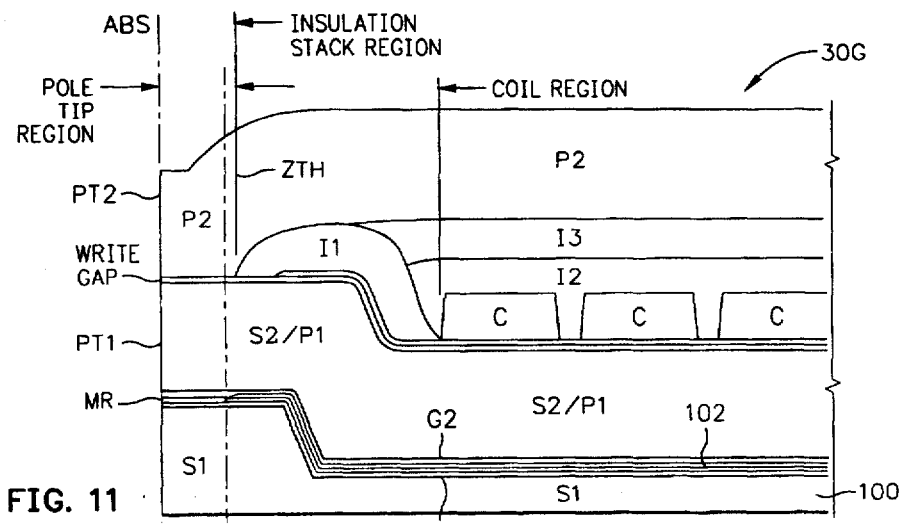
Figure 14:
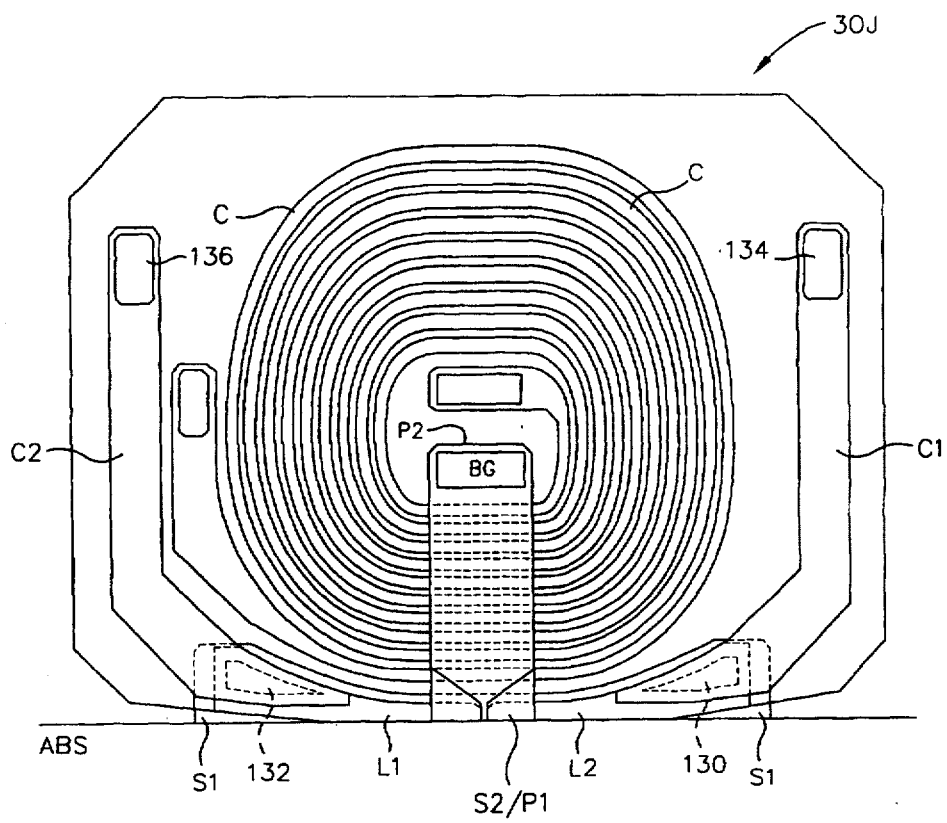
Figure 15:
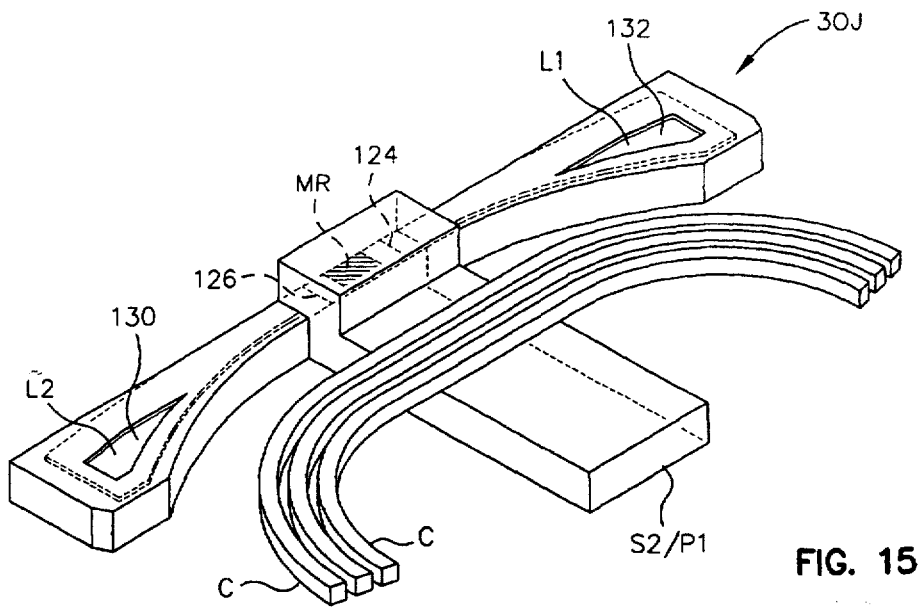
Figure 16:
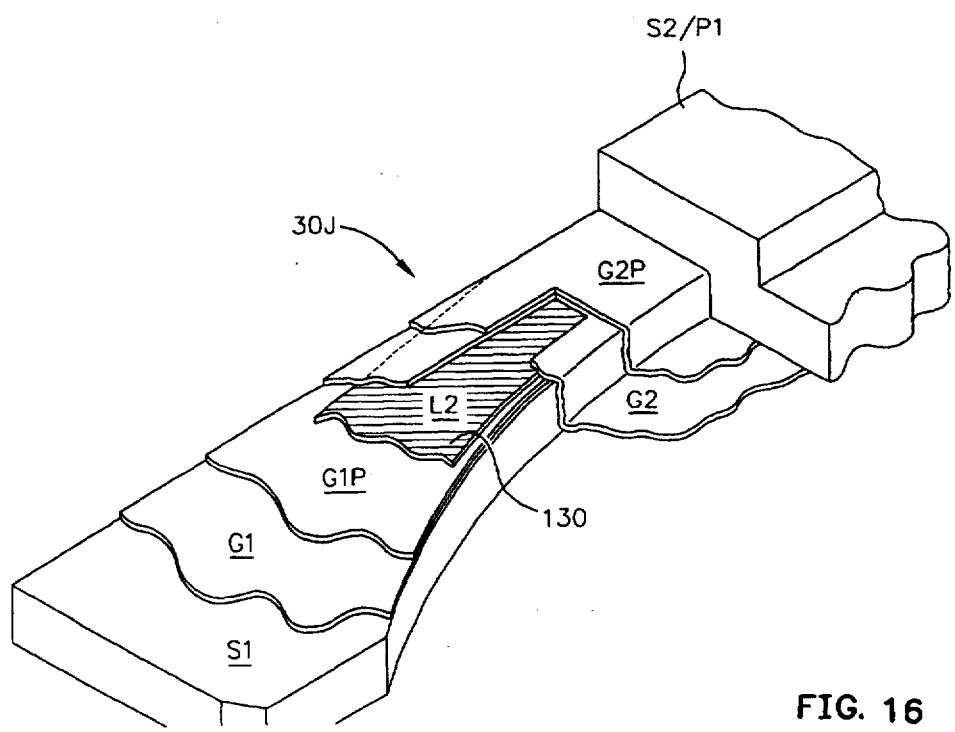

An embodiment 30G of the present invention, shown in FIG. 11, is a merged MR head wherein the second shield S2 and the first pole piece P1 are a common layer. In this embodiment the first shield S1 has a reduced thickness portion 100 which extends perpendicular to the ABS in the insulation stack region and the layer S2/P1 is a full thickness layer from the ABS to a back region of the head. Since the first shield layer S1, in the proximity of the write coil, is reduced in thickness there is less inductive resistance to the operation of the write coil. This embodiment employs leads, one of which is shown at 102, which are sandwiched between gap layers G1 and G2 and which extend perpendicular to the ABS in the insulation stack region.

In FIG. 12 there is shown a further embodiment 30H of the present invention which is a merged MR head. In this embodiment the first shield layer S1 terminates at 110 while the common layer S2/P1 has a reduced thickness portion 112 which extends perpendicular to the ABS in the insulation stack region. This embodiment will have a less inductive effect on the write coil than the 30D embodiment, however, it provide less protection for the MR sensor from stray EM fields. Leads for the MR sensor do not extend back into the head with the gap layers G1/G2 and will be described in more detail hereinafter.

Another embodiment 30I of the present invention is illustrated in FIG. 13 in the form of a merged MR head. In this embodiment a full length layer of the shield S1 is carried through the pole tip region to the insulation stack region. The common layer S2/P1 is provided with a pronounced height in the pole tip region but is significantly thinned down at 120 in the insulation stack region, the thickness 120 in the insulation stack region being about ⅛ of the thickness of the S2/P1 layer in the pole tip region. This provides additional height for recessing the insulation layers I1, I2 and I3 and the write coil within the head structure so that the second pole tip P2 can be more planarized. In this embodiment the lead layers, one of which is shown at 122, extends perpendicular to the ABS with the gap layers G1 and G2 in the insulation stack region.

Figure 14:
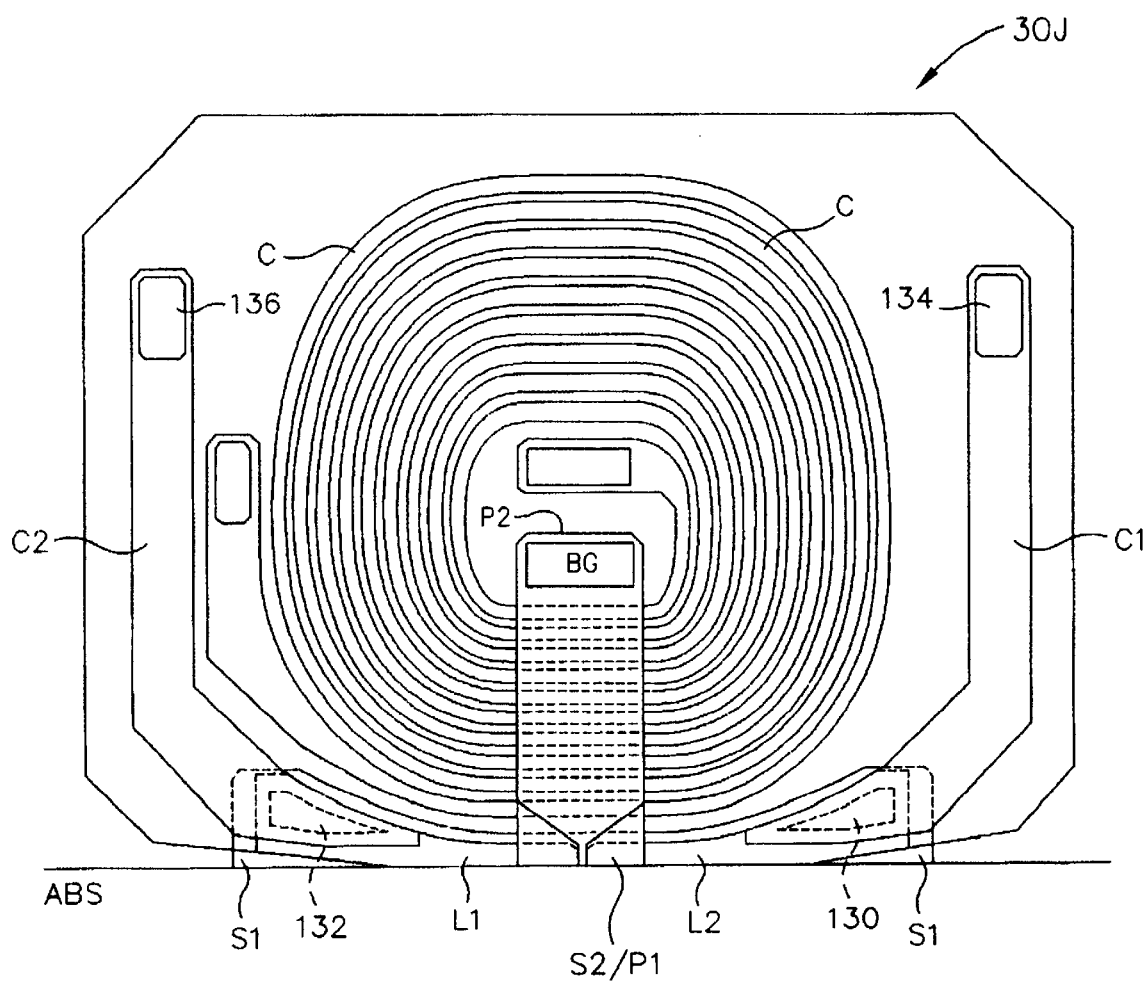
FIG. 14 is a top plan schematic illustration of a merged MR head of the present invention showing a unique scheme for routing leads from the MR sensor.
Figure 15:
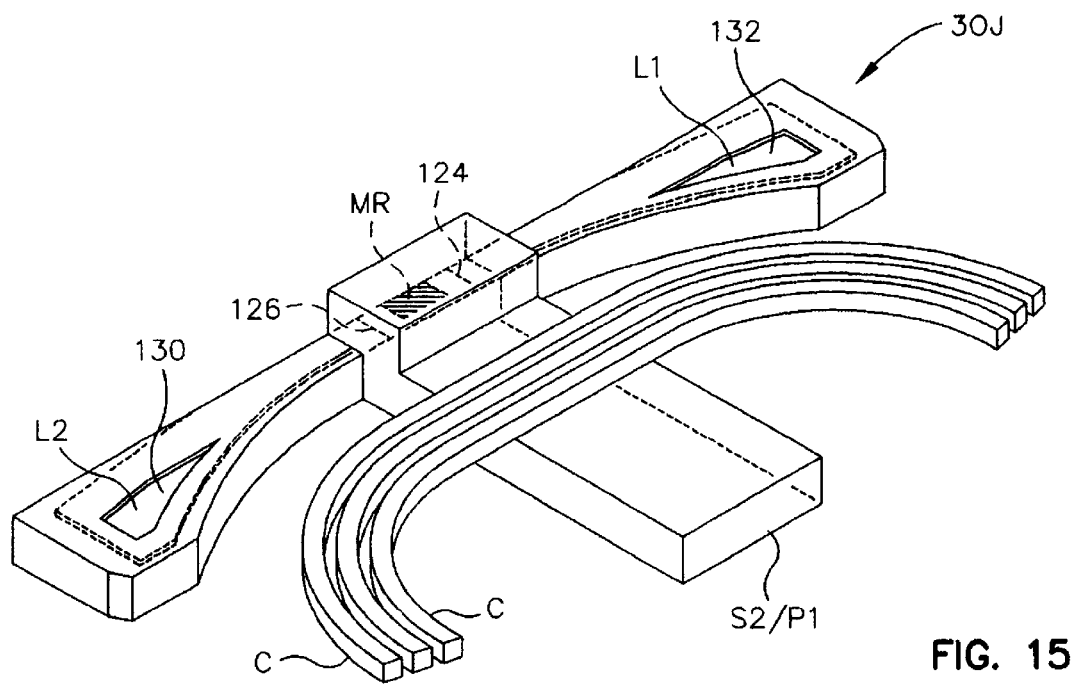
FIG. 15 is an isometric illustration of a front portion of a merged MR head with portions removed to show paths taken by first and second leads (hidden lines) from an MR sensor.
Figure 16:
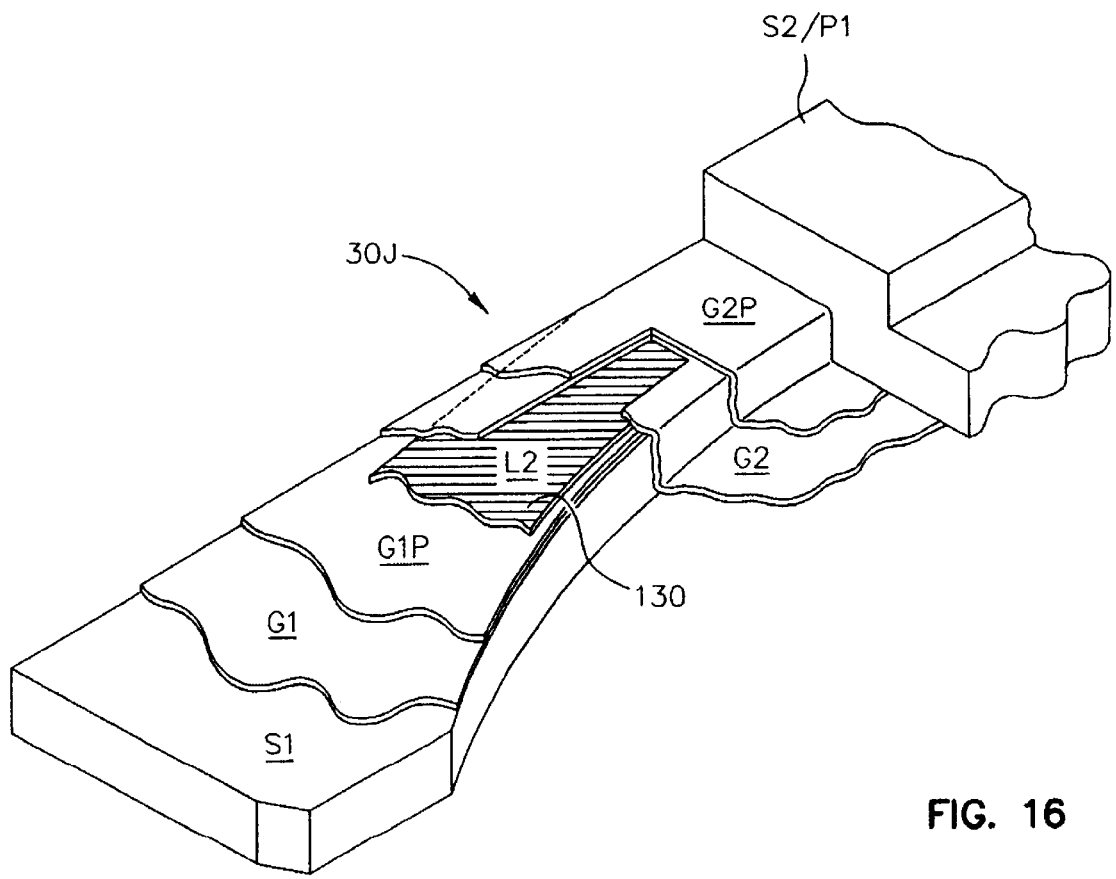
FIG. 16 is an isometric illustration of the left front portion of FIG. 15 with portions cut away to show details thereof.
Figure 1:
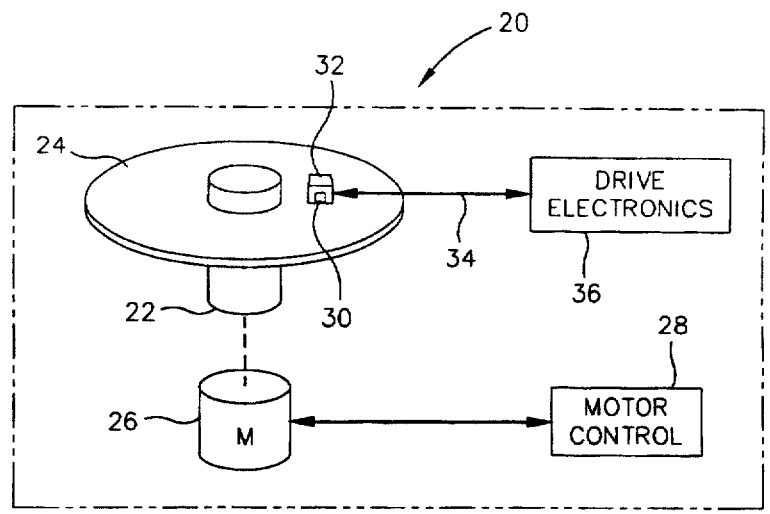
Figure 2:
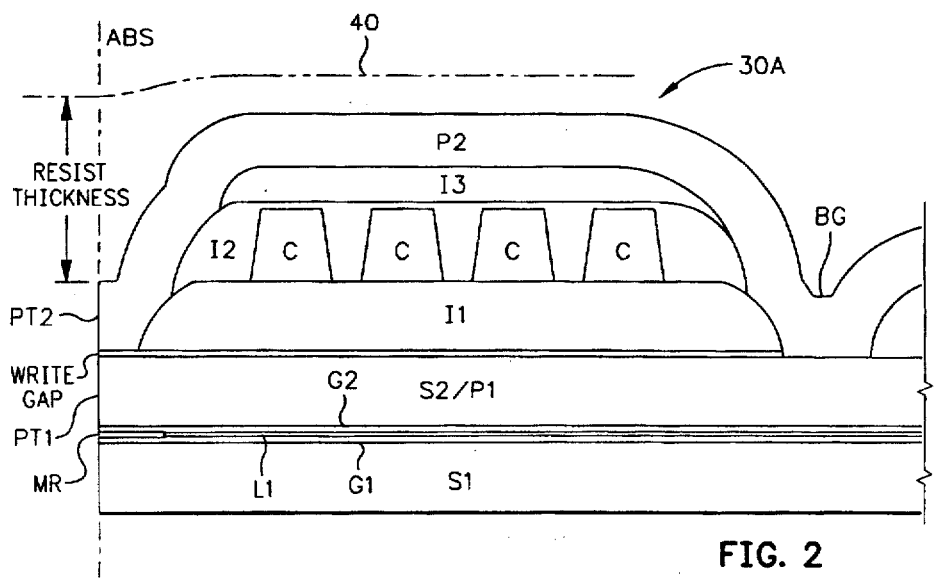

FIGS. 14, 15 and 16 show an embodiment 30J of the present invention which provides leads L1 and L2 for the embodiments 30B, 30D and 30H of the present invention shown in FIGS. 5, 8 and 12. In FIG. 14 the write coil C is shown about the back gap BG. In the embodiment 30J, first and second gap prefill layers G1P and G2P are employed, the first gap prefill layer G1P being on top of the first gap layer G1 and the second gap prefill layer G2P being on top of the second gap layer G2. All of the gap layers extend transverse to the head (parallel to the ABS) from the MR sensor, the gap layers G1 and G2 covering the bottom and top of the MR to establish a narrow read gap between the shields S1 and S2. The gap layers G1P and G2P terminate at the lines 124 and 126 shortly beyond the MR sensor (about 1 μm) as shown in FIG. 15. The leads L1 and L2, which may be contiguously connected to the MR sensor, are sandwiched between the gap layers G1P and G2 and extend with the gap layers on top of the first shield layer S1 transverse to the head beyond the limits of the S2/P1 layer. The gap layers G2 and G2P have vias 130 and 132 through which the leads L1 and L2 are connected to conductors C1 and C2 respectively. The conductors C1 and C2 extend back into the head free of shield layers and are connected to pads 134 and 136 which, in turn, can be connected to drive electronics 36, shown in FIG. 1. It should be noted that the leads L1 and L2 are protected along substantially their full lengths from shorting to the shield layers S1 and S2 by double gap layers. Accordingly, the gap layers G1 and G2 can be thin for good read resolution while the gap layers G1P and G2P ensure that potential pin holes in the gap layers G1 and G2 do not short the leads to either of the shield layers S1 and S2. For a detailed description of the prefill gap layers G1P and G2P, reference is made to a commonly assigned copending application entitled "Narrow Gap Magnetoresistive Read Head" by R. E. Fontana, et al., Ser. No. 08/366,277 filed Dec. 29, 1994 and issued as U.S. Pat. No. 5,568,336, which is incorporated by reference herein.

Obviously many modification and variations of the invention are possible in light of the above teachings and are to be construed only within the scope of the following claims.

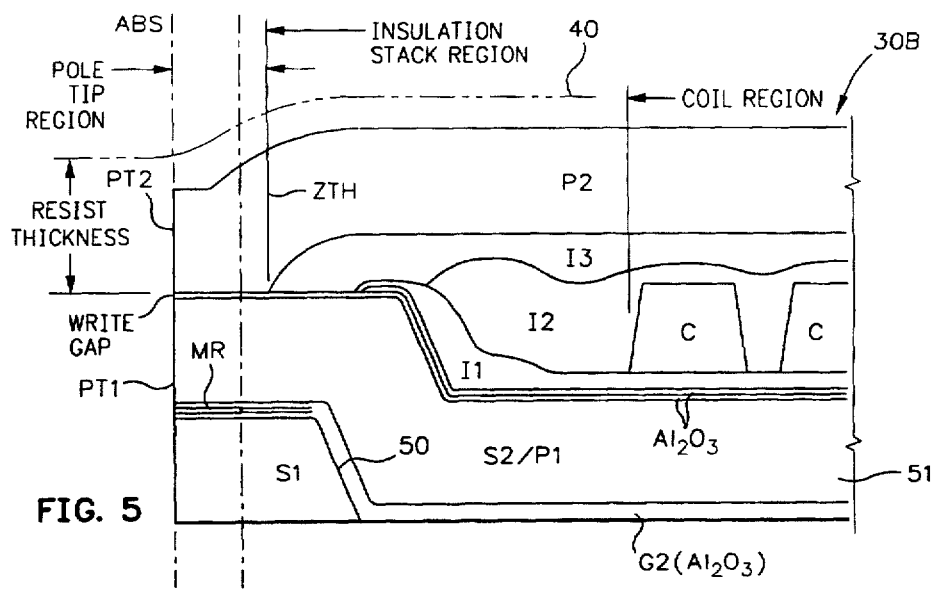
FIG. 5
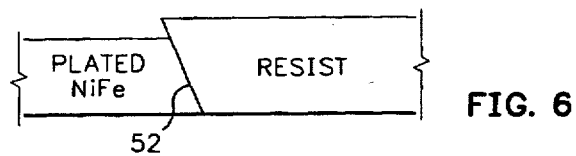
FIG. 6
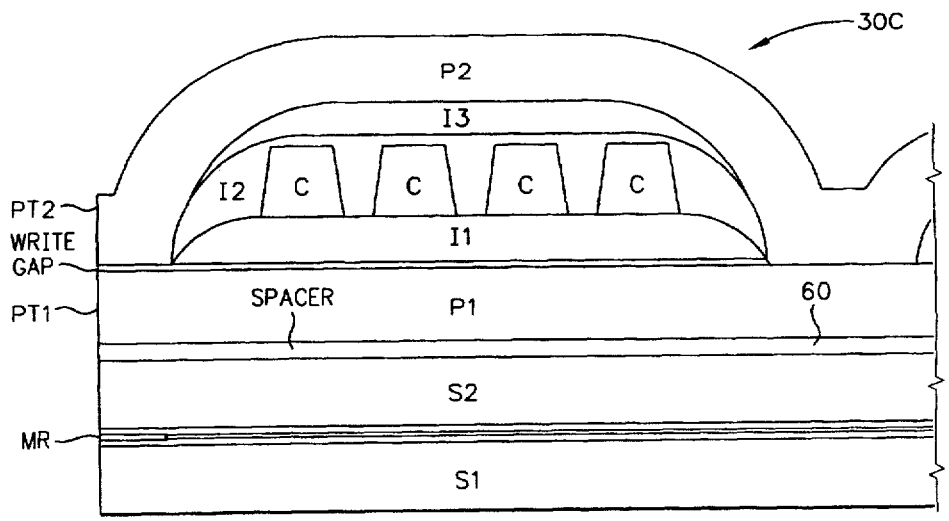

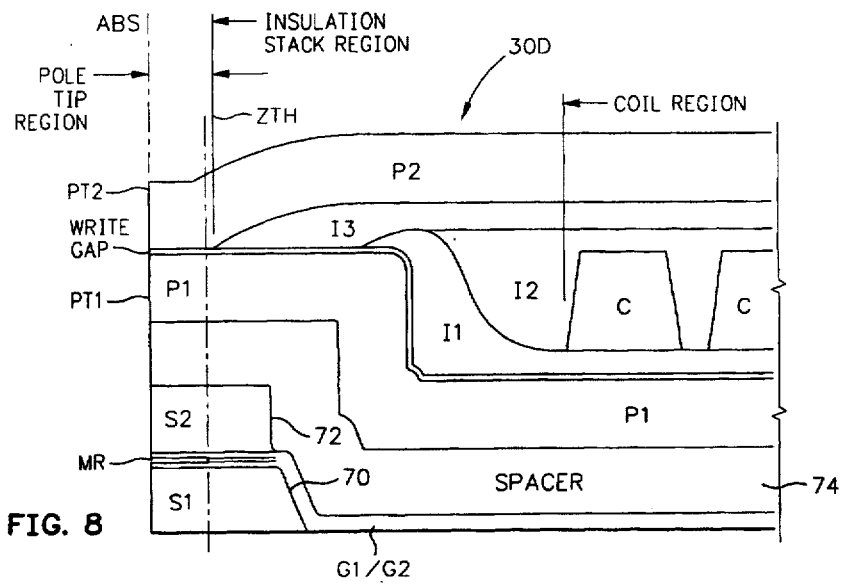
FIG. 8
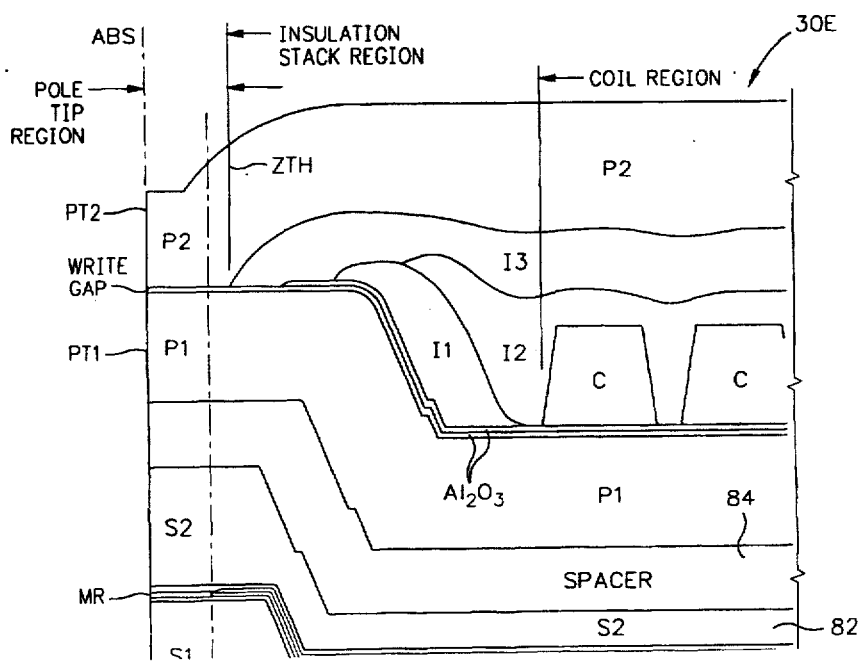

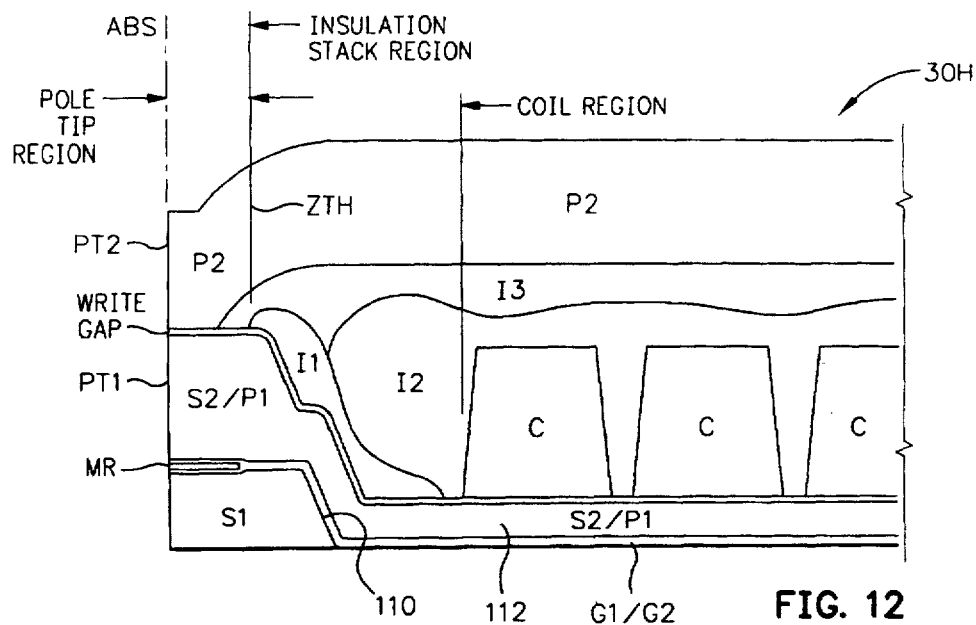
FIG. 12
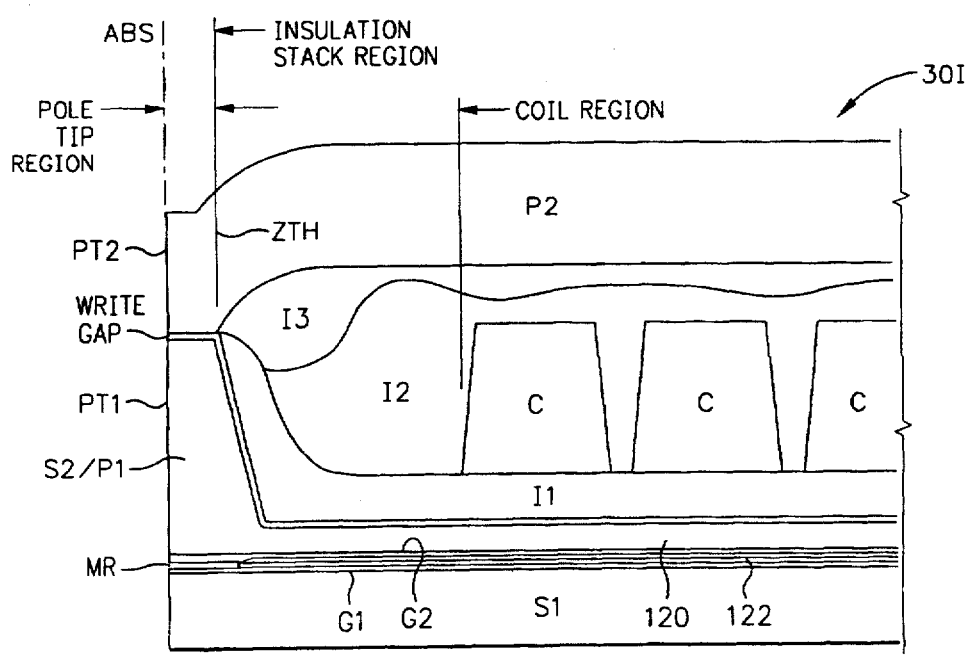

We claim:

1. A combined magnetoresistive (MR) read and inductive write head comprising:

an MR read sensor sandwiched between first and second gap layers which, in turn, are sandwiched between first and second shield layers;

a write coil which is sandwiched between insulation layers which are, in turn, sandwiched between first and second pole pieces, the pole pieces terminating at pole tips which are separated by a gap layer at an air bearing surface (ABS) and magnetically connected at a back gap;

the head having a pole tip region, an insulation stack region, and a coil region, the pole tip region extending from the ABS to the insulation stack region, the insulation stack region extending from the pole tip region to the back gap, and the coil region being located in the insulation stack region but spaced from the pole tip region;

the MR read sensor defining an MR region which has a width along the ABS and a depth into the head that extends perpendicular to the ABS;

the first and second shield layers being located in the pole tip region;

at least one of the first and second shield layers being absent or thinned down in the insulation stack region so as to provide a depression in the insulation stack region;

the write coil and the insulation layers being located within said depression;

the second pole piece being disposed on the insulation layers and the write coil;

first and second lead layers sandwiched between the first and second gap layers and connected to first and second opposite ends respectively of the MR sensor;

first and second conductors located transverse the MR sensor beyond the second shield layer;

the first and second lead layers extending parallel to the ABS from the MR sensor and connected to the first and second conductors respectively through vias in the second gap layer that are located beyond the second shield layer;

first and second gap prefill layers;

the first gap prefill layer being sandwiched between the first gap layer on one side and the first and second lead layers on an opposite side, the first and second lead layers being sandwiched between the first gap prefill layer and the second gap layer, the second gap layer being sandwiched between the first and second lead layers on one side and the second gap prefill layer on an opposite side, and the first gap layer, the first gap prefill layer, the first and second lead layers, the second gap layer and the second gap prefill layer being sandwiched between the first and second shield layers with the exception that the first and second gap prefill layers are not sandwiched between the first and second shield layers in said MR region;

the second gap prefill layer also having vias that are located beyond the second shield layer for connecting the first and second leads to the first and second conductors; and the first and second conductors extending beyond the first and second shield layers back into the head in directions transverse to the ABS and having terminal ends which are connected to first and second pads.

2. A combined magnetoresistive (MR) read and inductive write head comprising:

an MR read sensor sandwiched between first and second gap layers which, in turn, are sandwiched between first and second shield layers;

a write coil which is sandwiched between insulation layers which are, in turn, sandwiched between first and second pole pieces, the pole pieces terminating at pole tips which are separated by a gap layer at an air bearing surface (ABS) and magnetically connected at a back gap;

the head having a pole tip region, an insulation stack region, and a coil region, the pole tip region extending from the ABS to the insulation stack region, the insulation stack region extending from the pole tip region to the back gap, and the coil region being located in the insulation stack region but spaced from the pole tip region;

the MR read sensor defining an MR region which has a width along the ABS and a depth into the head that extends perpendicular to the ABS;

the first and second shield layers being located in the pole tip region;

at least one of the first and second shield layers being absent or thinned down in the insulation stack region so as to provide a depression in the insulation stack region;

the write coil and the insulation layers being located within said depression;

the second pole piece being disposed on the insulation layers and the write coil;

one of the first and second shield layers terminating at a back wall which is located between the pole tip region and the coil region;

said one of the first and second shield layers being said first shield layer;

first and second lead layers sandwiched between the first and second gap layers and connected to first and second opposite ends respectively of the MR sensor;

first and second conductors located transverse the MR sensor beyond the second shield layer;

the first and second lead layers extending parallel to the ABS from the MR sensor and connected to the first and second conductors respectively through vias in the second gap layer;

first and second gap prefill layers;

the first gap prefill layer being sandwiched between the first gap layer on one side and the first and second lead layers on an opposite side, the first and second lead layers being sandwiched between the first gap prefill layer and the second gap layer, the second gap layer being sandwiched between the first and second lead layers on one side and the second gap prefill layer on an opposite side, and the first gap layer, the first gap prefill layer, the first and second lead layers, the second gap layer and the second gap prefill layer being sandwiched between the first and second shield layers with the exception that the first and second gap prefill layers are not sandwiched between the first and second shield layers in said MR region;

the second gap prefill layer also having vias for connecting the first and second leads to the first and second conductors; and the first and second conductors extending beyond the first and second shield layers back into the head in directions transverse to the ABS and having terminal ends which are connected to first and second pads.

3. A head as claimed in claim 2 wherein:

the second shield layer includes a first portion in the pole tip region, a second portion in the insulation stack region and a sloping portion interconnecting the first and second portions, the sloping portion having a sloping front wall facing the back wall of the first shield layer and a sloping back wall forming a front wall of said depression.

4. A head as claimed in claim 3 wherein;

the first, second and sloping portions of the second shield are substantially the same thickness; and the second shield layer and the first pole piece form a single layer.

5. A head as claimed in claim 3 wherein;

the second portion of the second shield layer is thinner than the first portion of the second shield layer.

6. A combined magnetoresistive (MR) read and inductive write head comprising:

an MR read sensor sandwiched between first and second gap layers which, in turn, are sandwiched between first and second shield layers;

a write coil which is sandwiched between insulation layers which are, in turn, sandwiched between first and second pole pieces, the pole pieces terminating at pole tips which are separated by a gap layer at an air bearing surface (ABS) and magnetically connected at a back gap;

the head having a pole tip region, an insulation stack region, and a coil region, the pole tip region extending from the ABS to the insulation stack region, the insulation stack region extending from the pole tip region to the back gap, and the coil region being located in the insulation stack region but spaced from the pole tip region;

the MR read sensor defining an MR region which has a width along the ABS and a depth into the head that extends perpendicular to the ABS;

the first and second shield layers being located in the pole tip region;

at least one of the first and second shield layers being absent or thinned down in the insulation stack region so as to provide a depression in the insulation stack region;

the write coil and the insulation layers being located within said depression; and the second pole piece being disposed on the insulation layers and the write coil;

one of the first and second shield layers terminating at a back wall which is located between the pole tip region and the coil region;

both of the first and second shield layers terminating between the pole tip region and the insulation stack region;

first and second lead layers sandwiched between the first and second gap layers and connected to first and second opposite ends respectively of the MR sensor;

first and second conductors located transverse the MR sensor beyond the second shield layer;

the first and second lead layers extending parallel to the ABS from the MR sensor and connected to the first and second conductors respectively through vias in the second gap layer;

first and second gap prefill layers;

the first gap prefill layer being sandwiched between the first gap layer on one side and the first and second lead layers on an opposite side, the first and second lead layers being sandwiched between the first gap prefill layer and the second gap layer, the second gap layer being sandwiched between the first and second lead layers on one side and the second gap prefill layer on an opposite side, the first gap layer, the first gap prefill layer, the first and second lead layers, the second gap layer and the second gap prefill layer being sandwiched between the first and second shield layers with the exception that the first and second gap prefill layers are not sandwiched between the first and second shield layers in said MR region;

the second gap prefill layer also having vias for connecting the first and second leads to the first and second conductors; and the first and second conductors extending beyond the first and second shield layers back into the lead in directions transverse to the ABS and having terminal ends which are connected to first and second pads.

* * * * *

UNITED STATES PATENT AND TRADEMARK OFFICE
CERTIFICATE OF CORRECTION

PATENT NO. : 6,025,977
DATED : February 15, 2000
INVENTOR(S) : Hu et al.

It is certified that error appears in the above-identified patent and that said Letters Patent is hereby corrected as shown below:

Drawings,
Substitute accompanying Figs. 1, 2, 3A, 4A, 4B and 5-16 for Figs. 1, 2, 3A, 3B, 4A, 4B, 5A, 5B, 6A, 6B, 7A, 7B, 8A, 8B, 9, 10, 11A-11C, 12A-12C and 13A-13C. Delete drawing sheets 1-9 and substitute therefor the drawing sheets, consisting of Figs. 1-16 as shown on the attached pages.

Signed and Sealed this

Fifth Day of February, 2002

Attest:

JAMES E. ROGAN
*Attesting Officer*   *Director of the United States Patent and Trademark Office*